(No Model.)　　　　　　　　　　B. F. RICH.　　　　3 Sheets—Sheet 1.
REAPING MACHINE.
No. 557,608.　　　　　　　　　　　　　　　Patented Apr. 7, 1896.
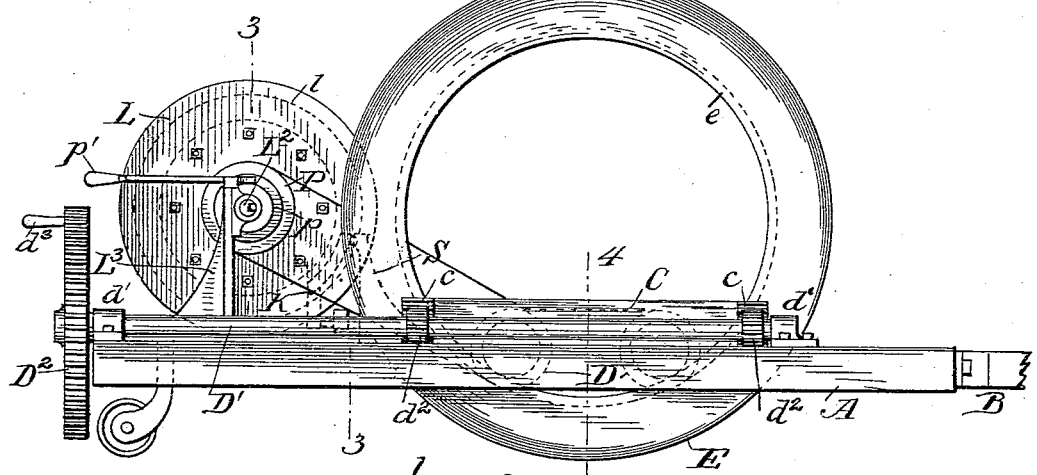
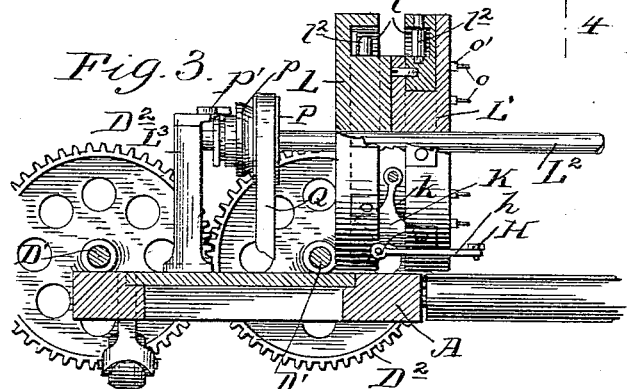
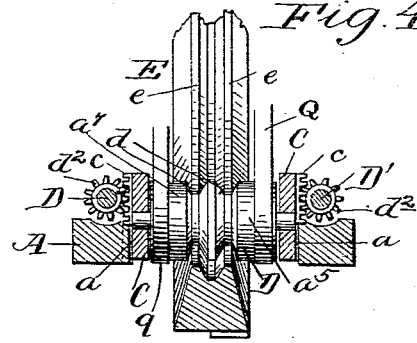
WITNESSES　　　　　　　　　　　　　　INVENTOR
Chas. W. Parker　　　　　　　　　　Benjamin F. Rich
G. A. Pennington　　　　　　　　　by Jos. H. Hunter
　　　　　　　　　　　　　　　　　　　Attorney

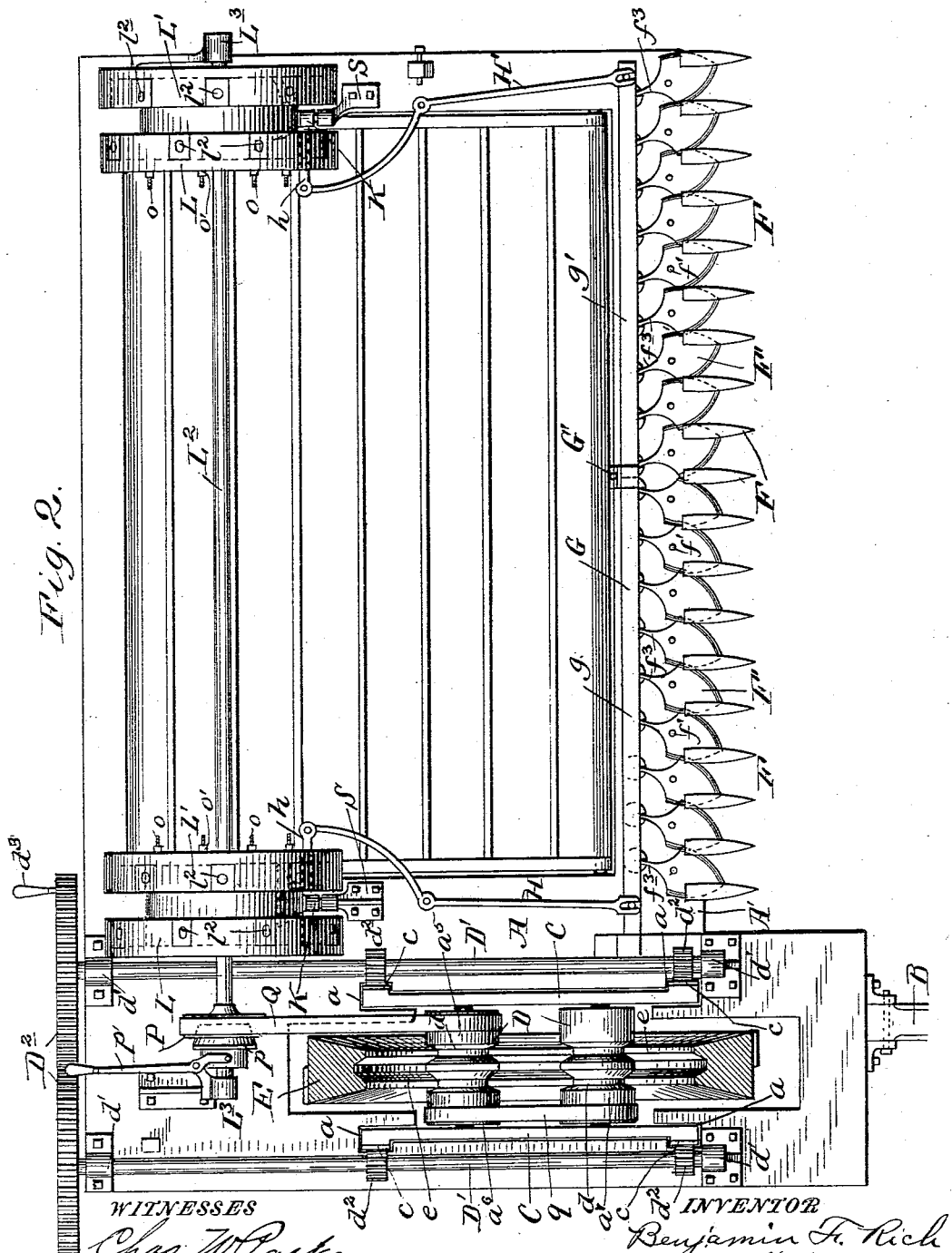

(No Model.) 3 Sheets—Sheet 3.
B. F. RICH.
REAPING MACHINE.
No. 557,608. Patented Apr. 7, 1896.
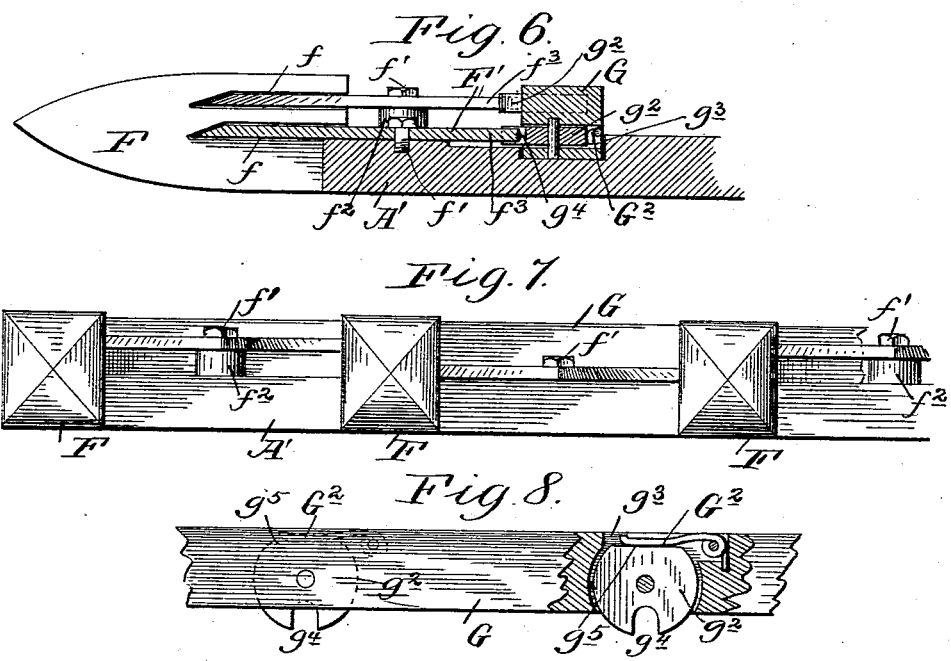
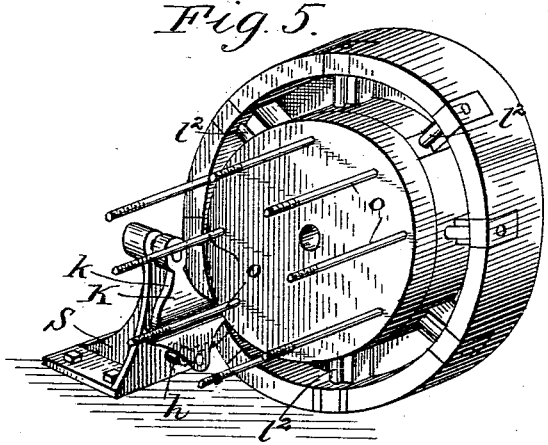
WITNESSES
Chas. W. Parker
G. A. Pennington
INVENTOR
Benjamin F. Rich
by Jos. H. Hunter
Attorney

UNITED STATES PATENT OFFICE.

BENJAMIN F. RICH, OF SPANISH FORT, TEXAS.

REAPING-MACHINE.

SPECIFICATION forming part of Letters Patent No. 557,608, dated April 7, 1896.

Application filed August 22, 1895. Serial No. 560,166. (No model.)

*To all whom it may concern:*

Be it known that I, BENJAMIN F. RICH, a citizen of the United States, residing at Spanish Fort, in the county of Montague and State of Texas, have invented certain new and useful Improvements in Reaping-Machines, of which the following is a specification, reference being had therein to the accompanying drawings.

This invention relates to an improvement in reapers; and it consists in the construction and arrangement of parts hereinafter described, and definitely pointed out in the claims.

The aim and purpose of the invention is to provide a reaper with suitable mechanism which will render its working very positive, its draft easy, and which will embody structural features which serve to simplify and improve the general working of the machine.

The invention is illustrated in the accompanying drawings, wherein like letters of reference designate corresponding parts in the several views, and in which—

Figure 1 is a side elevation. Fig. 2 is a plan view, the driving-wheel being shown in section. Fig. 3 is a section on the line 3 3, Fig. 1. Fig. 4 is a section on the line 4 4, Fig. 1. Fig. 5 is a detail view of the driving-disk and its associated parts. Figs. 6, 7, and 8 are detail views of the cutting apparatus.

In the drawings, A designates the base, and B the tongue. The base is recessed at one side and mounted in suitable guideways $a$. On opposite sides of the recess are the slides C, each having the toothed racks $c$ on their outer faces at opposite ends. In these slides are mounted the supporting and actuating rolls D, each having the two annular grooves $d$ therein. These rolls are adjusted vertically by the adjusting-shafts D' mounted in bearings suitably located adjacent the opposite ends of the slides and the shafts extending parallel with the slides. Each shaft D' has the gears $d^2$ thereon, which mesh with the racks $c$. To turn the shafts simultaneously, suitable intermeshing gears D² are mounted on the ends at the rear of the machine, one of which is provided with a handle $d^3$. By turning the shafts the platform is raised or lowered, as the case may be.

E designates the ground-wheel, which consists of a rim only having the internal flanges $e$, which enter the grooves $d$. The rolls D thus serve to maintain the rim in an upright position, and as the latter is turned the motion is transmitted to the rolls.

F designates the guard-fingers, which are formed with two slots $f$, one directly above the other, thus forming what I term a "double guard." These fingers are arranged on the forward part A' of the base or platform, which serves as a finger-bar.

Pivotally mounted on suitable vertical pins $f'$ on the base are the knives F', each alternate knife having a bushing $f^2$ on its under side to carry the blade parallel with the upper slot $f$ of the fingers, while the other knives work in the lower slots. From the rear of each knife extends a finger $f^3$, preferably tapered, as shown. The cutting edges of the knives are of the usual form.

G designates the cutter-bars, formed in two independent sections $g\ g'$ and each section having its inner end slidingly secured in a guide G' on the platform. The sections are formed with the plates $g^2$ pivotally secured in horizontal recesses $g^3$, each cam having a notch $g^4$, in which the end of a blade-finger $f^3$ fits. To prevent the independent movement of the plates relative to the cutter-bar, strong springs G² are secured to the bars and bear against the rear edges of the plates, preferably in recesses or grooves $g^5$. By this means should the knife strike some non-penetrable substance the bar would continue its movement, while the knife would be stopped by the springs slipping on the plates.

To drive the cutter-bars, I employ the following mechanism:

H H' designate rocking levers pivoted to the platform on opposite sides of the grain-path. The forward ends of these levers are slidingly secured to the outer ends of the cutter-bars, while their rear ends are elevated and have pivotally connected therewith the links $h$, which in turn are pivotally connected to the under side of the rocking cams K. These cams are pivotally mounted on the rear faces of the standards S, springing from the platform. Each cam has the oppositely-curved upper edge $k$ and is arranged so that its curved ends will enter the annular grooves $l$, formed in the contiguous faces of the drive-disks L L'.

The driving-disks L L' are arranged in pairs at opposite sides of the machine, each pair being secured to a transverse shaft $L^2$, mounted in the uprights $L^3$. One member, L, has the fixed pins $o$ projecting from its side, which engage in apertures in the other member, L', and by suitable nuts $o'$ are held from moving. By loosening the nuts the inner member, which is conveniently loose on the shaft, can be moved toward or from the outer member to vary the position of the ends of the cams in the grooves $l$.

Extending across the groove $l$ in the path of the cam ends are a series of radial rollers $l^2$, mounted in suitable boxes. These rollers are staggered relative to the rollers on the opposite member.

To drive the shaft $L^2$, a loose pulley P is mounted on its end adjacent to the drive-wheel. This pulley has a suitable clutching engagement with the shaft through the instrumentality of the sliding clutch $p$, which is mounted to rotate with the shaft and is actuated by a forked lever $p'$, pivoted to a suitable fixed part of the machine.

Q designates a driving-belt running over the pulley P and the part $a^5$ of the rear roll D. The movement of the roll drives the belt. A belt $q$ is placed from part $a^6$ of the rear roll to part $a^7$ of the other roll, so that the movement of both rolls may be transmitted to the belt Q. Suitable caster-wheels are placed at the proper points around the machine.

In operation the large traction-ring serves as means for moving all the parts and as a track on which the rollers move. As the drive-disks are turned, the radial pin-rollers engage alternately the opposite inclined ends of the rocking cams and thereby rock the levers H H', which in turn reciprocate the cutter-bars. The roller-pins are so arranged that the two cutter-bars vibrate simultaneously in opposite directions, thereby in a measure destroying the lateral vibration of the machine. The knives are oscillated on their pivots and make the cut in both directions.

By arranging the knives on different planes the cutter-bars are permitted independent or opposite movements without interfering with each other. The advantage in employing the roller-pins in grooves $l$ is to reduce the friction between the same and rocking cams.

Suitable casings may be placed over the drive disks and cams, and other working parts may be cased in, as is obvious.

The grain as it leaves the knives is carried back between the drive-disks and may be delivered in any suitable manner to a binder.

I may conveniently use a conveyer, as shown in Fig. 1, the same being of any well-known form and operated in any desirable manner. I, however, do not consider that feature as a part of my invention.

It will be seen by the construction that the machine may be lowered very close to the ground and thereby avoid the unnecessary elevation of the grain.

I am aware that many minor changes can be made and substituted for the parts shown and described without in the least departing from the nature and principle of my invention.

Having thus fully described my invention, what I claim as new, and desire to secure by Letters Patent, is—

1. In a reaper, the combination with a base having a recess, of grooved rollers spanning the recess, slides in which the rollers are mounted, horizontal shafts, means for simultaneously moving the shafts, pinions on the shafts, racks on the slides engaging the pinions, a ring driving-wheel surrounding the rollers having interior flanges fitting in the grooves of the rollers, cutters, mechanism for actuating the same, a belt extending from the rollers to the actuating mechanism, and a belt connecting the rolls substantially as described.

2. In a reaping-machine, a series of pivotally-supported knives having finger projections, and a reciprocating cutter-bar having independent movable notched plates with which the fingers engage, springs for normally preventing the independent movement of the notched plates, and means for driving the cutter-bar, substantially as described.

In testimony whereof I affix my signature in presence of two witnesses.

BENJAMIN F. RICH.

Witnesses:
 G. W. ROBERTS,
 G. G. HORTON.